(12) United States Patent
Fujimoto

(10) Patent No.: US 10,133,371 B2
(45) Date of Patent: Nov. 20, 2018

(54) PANEL AND TOUCHPAD

(71) Applicant: KABUSHIKI KAISHA TOKAI RIKA DENKI SEISAKUSHO, Aichi (JP)

(72) Inventor: Takeshi Fujimoto, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 5 days.

(21) Appl. No.: 15/352,015

(22) Filed: Nov. 15, 2016

(65) Prior Publication Data

US 2017/0153723 A1  Jun. 1, 2017

(30) Foreign Application Priority Data

Nov. 30, 2015  (JP) .................................. 2015-232928

(51) Int. Cl.
*G06F 3/0354* (2013.01)
*H01H 13/83* (2006.01)
*F21V 8/00* (2006.01)
*G06F 3/044* (2006.01)

(52) U.S. Cl.
CPC ....... *G06F 3/03547* (2013.01); *G02B 6/0086* (2013.01); *G06F 3/044* (2013.01); *H01H 13/83* (2013.01)

(58) Field of Classification Search
CPC ...... G06F 3/03547; G06F 3/041; H01H 13/83
See application file for complete search history.

(56) References Cited

U.S. PATENT DOCUMENTS

2010/0187079 A1\* 7/2010 Dumont ................. H01H 13/83
200/341
2014/0118264 A1\* 5/2014 Leong ................... G06F 3/0202
345/168
2014/0286051 A1 9/2014 Okura et al.

FOREIGN PATENT DOCUMENTS

JP  2010-118282 A  5/2010

OTHER PUBLICATIONS

Extended European Search Report issued in the corresponding EP application No. 16200833.8 dated Mar. 31, 2017.

\* cited by examiner

*Primary Examiner* — Vijay Shankar
*Assistant Examiner* — Cory A Almeida
(74) *Attorney, Agent, or Firm* — Roberts Mlotkowski Safran Cole & Calderon, P.C.

(57) ABSTRACT

A panel includes a light-transmissive main body including an upper portion and a plurality of side portions contiguous with the upper portion, a recess being formed at a border between an inner surface of the upper portion and an inner surface of at least one of the plurality of side portions, and a light-blocking part formed in the recess and on an inner surface of the main body except a design part that transmits light, the light-blocking part being configured to block light.

11 Claims, 2 Drawing Sheets

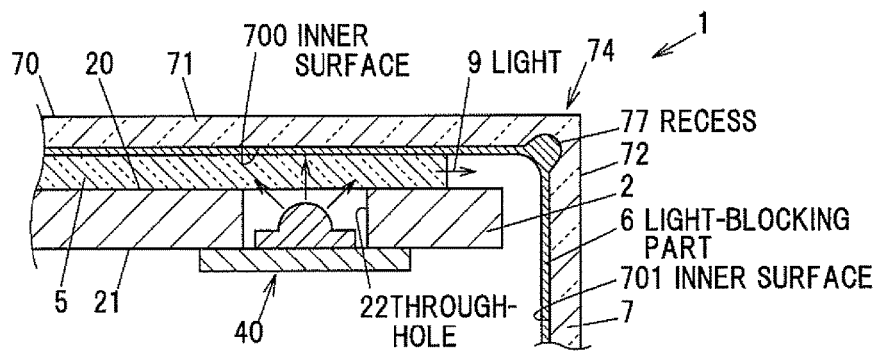
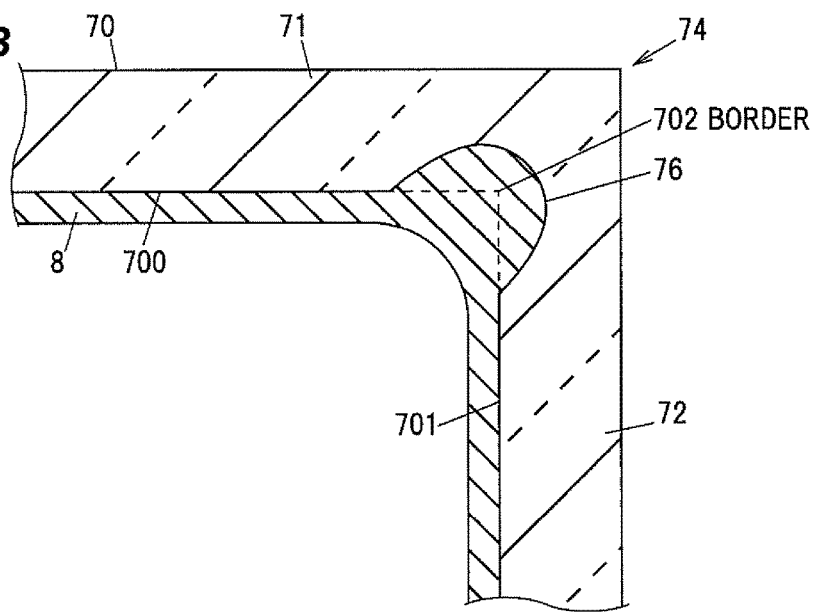
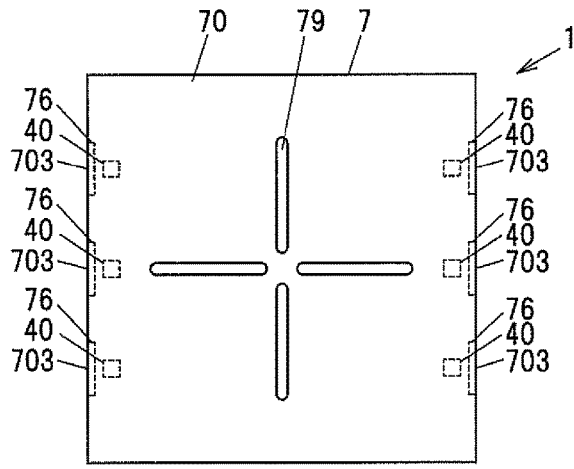

PANEL AND TOUCHPAD

The present application is based on Japanese patent application No. 2015-232928 filed on Nov. 30, 2015, the entire contents of which are incorporated herein by reference.

TECHNICAL FIELD

The present invention relates to a panel and a touchpad.

BACKGROUND ART

A cover member for an illuminated push-button switch that includes a light-blocking layer on a front surface of a key top and that is illuminated from a back surface of the key top is known as conventional art (see Patent Document 1, for example).

In this cover member for an illuminated push-button switch, the light-blocking layer is formed in a punch-out shape aside from portion through which a letter or the like is displayed when illuminated.

CITATION LIST

Patent Literature

Patent Document 1: Japanese Unexamined Patent Application Publication No. 2010-118282A

SUMMARY OF INVENTION

Technical Problem

In this conventional cover member for an illuminated push-button switch, the light-blocking layer is formed on the front surface of the key top, and thus the light-blocking layer may degrade with use. In a case where the light-blocking layer is formed on an inner surface of the key top through coating to avoid such degradation, the coating material does not flow well at borders between an inner surface of an upper portion and inner surfaces of side portions, which may result in the light-blocking layer becoming thin and light leakage. This in turn may compromise the design.

Accordingly, an object of the present invention is to provide a panel and a touchpad that minimizes light leakage to achieve a superior design.

Solution to Problem

An aspect of the present invention provides a panel including: a light-transmissive main body including an upper portion and a plurality of side portions contiguous with the upper portion, a recess being formed at a border between an inner surface of the upper portion and an inner surface of at least one of the plurality of side portions; and a light-blocking part formed on the recess and on an inner surface of the main body aside from a design part that transmits light, the light-blocking part being configured to block light.

Another aspect of the present invention provides a touchpad including: a panel including a light-transmissive main body including an upper portion and a plurality of side portions contiguous with the upper portion, a recess being formed at a border between an inner surface of the upper portion and an inner surface of at least one of the plurality of side portions, and a light-blocking part formed on the recess and on an inner surface of the main body aside from a design part that transmits light, the light-blocking part being configured to block light; a detector configured to detect a touch operation made on a front surface of the upper portion; a substrate disposed on an inner side of the panel, the detector being disposed on the substrate; and a light source part disposed on the substrate in the periphery of the detector, the light source part being configured to output light.

Advantageous Effects of Invention

According to the present invention, light leakage is minimized and a superior design is achieved.

BRIEF DESCRIPTION OF DRAWINGS

FIG. 2A is an example of a cross section of the touchpad according to the embodiment, taken from a line II(a)-II(a) in FIG. 1A.

FIG. 2B is an example of an enlarged view of the vicinity of a corner portion.

FIG. 2C is a plan view of the touchpad illustrated in FIG. 1A.

DESCRIPTION OF EMBODIMENT

Overview of Embodiment

A panel according to the embodiment primarily includes a light-transmissive main body including an upper portion and a plurality of side portions contiguous with the upper portion, a recess being formed at a border between an inner surface of the upper portion and an inner surface of at least one of the plurality of side portions, and a light-blocking part formed on the recess and on an inner surface of the main body aside from a design part that transmits light, the light-blocking part being configured to block light.

In this panel, the recess is formed at the border between the upper portion and the side portion, where it is difficult to form the light-blocking part. This makes it possible to prevent the light-blocking part from becoming thinner at the border than at other areas, which minimizes light leakage from the border more, and provides a superior design, than in a case where the recess is not provided.

Embodiment

General Description of Touchpad 1

Figure 1A:
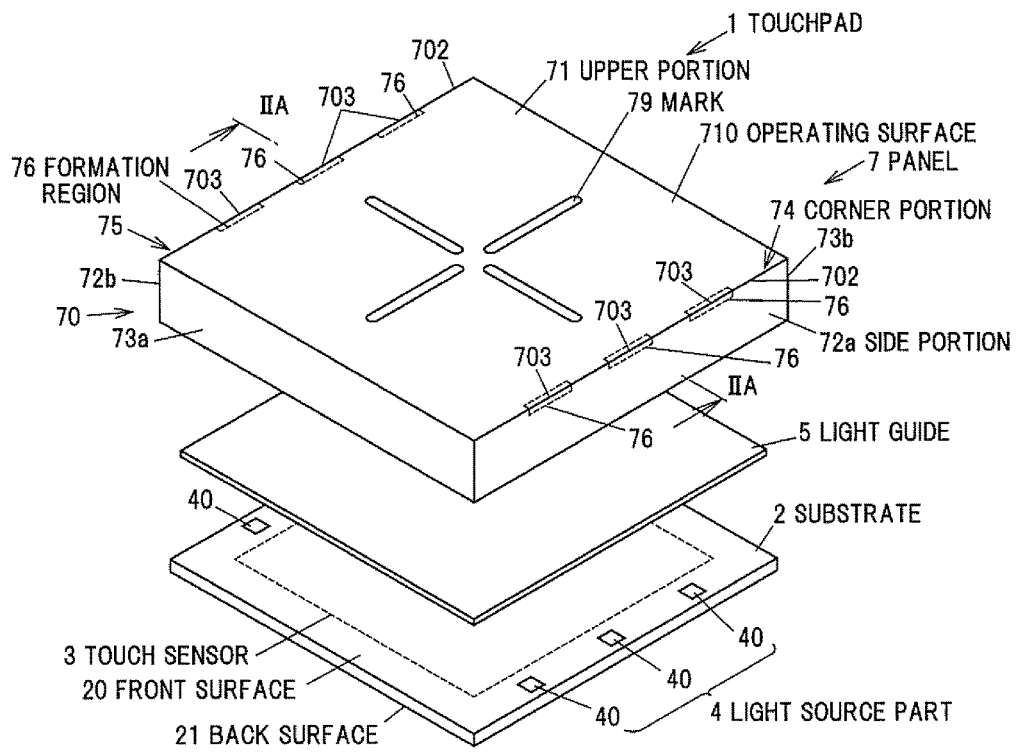
FIG. 1A is a developed view illustrating an example of a touchpad according to an embodiment.
Figure 1B:
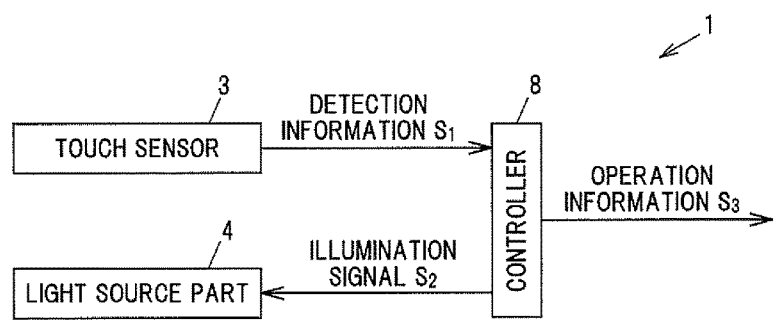
FIG. 1B illustrates an example of a block diagram of a touchpad.

FIG. 1A is a developed view illustrating an example of a touchpad according to the embodiment, and FIG. 1B illustrates an example of a block diagram of the touchpad. FIG. 2A is an example of a cross section of the touchpad according to the embodiment, taken from a line II(a)-II(a) in FIG. 1A, and FIG. 2B is an example of an enlarged view of the vicinity of a corner portion. In the drawings associated with the following embodiment, ratios between elements in the drawings may be different from the actual ratios. In addition, in FIG. 1B, arrows indicate the flows of primary signals, information, and the like.

A touchpad 1 is, for example, disposed in a floor console of a vehicle and is used as a remote operation unit for an electronic device of the vehicle. Examples of this electronic device include navigation devices, air conditioning devices, audio playback devices, video playback devices, and the like.

As illustrated in FIGS. 1A, 1B, and 2A, the touchpad 1 primarily includes: a panel 7 including a light-transmissive main body 70 that includes an upper portion 71 and a plurality of side portions (a side portion 72a, a side portion 72ba side portion 73a, and a side portion 73b) contiguous with the upper portion 71, a recess 77 being formed at a border 702 between an inner surface 700 of the upper portion 71 and an inner surface 701 of at least one of the plurality of side portions (the side portion 72a and the side portion 72b), and a light-blocking part 6 formed on the recesses 77 and on the inner surface of the main body 70 aside from a design part that transmits light, the light-blocking part 6 being configured to block light; a touch sensor 3 serving as a detector configured to detect a touch operation made on an operating surface 710 corresponding to a front surface of the upper portion 71; a substrate 2 disposed on an inner side of the panel 7, the touch sensor 3 being disposed on the substrate 2; and a light source part 4 disposed on the substrate 2 in the periphery of the touch sensor 3, the light source part 4 being configured to output light.

The touchpad 1 further includes a light guide 5 disposed between the upper portion 71 and the substrate 2. The light guide 5 is configured to guide the light output from the light source part 4 to illuminate the upper portion 71.

Furthermore, as illustrated in FIG. 1B, the touchpad 1 includes a controller 8 configured to control the touch sensor 3 and the light source part 4.

Note that the above-described design part that allows light to pass therethrough corresponds to a mark 79 having a shape in which lines are at 90° against adjacent lines, as illustrated in FIG. 1A. The mark 79 is a region where the light-blocking part 6 is not formed, or in other words, a region that emit the light from the light source part 4.

That light is transmitted, for example, means that light is emitted through an object having a light transmittance of 70% or more. That light is blocked, for example, means that the intensity of light is reduced by an object having a light transmittance of 1% or less.

Configuration of Substrate 2

The substrate 2 is a rectangular printed wiring substrate, for example. As illustrated in FIG. 1A, the touch sensor 3 is centrally disposed on a front surface 20 of the substrate 2. Note that the controller 8 is disposed on the substrate 2, for example.

As illustrated in FIG. 2A, the substrate 2 has a plurality of through-holes 22 formed therethrough from the front surface 20 to a back surface 21. Light-emitting elements 40 of the light source part 4 are disposed in the through-holes 22. Accordingly, the through-holes 22 are formed in conformity to the light-emitting elements 40.

Configuration of Touch Sensor 3

The touch sensor 3 is a sensor configured to detect a touch operation, a tracing operation, or the like made on the operating surface 710 of the panel 7. The touch sensor 3 is an electrostatic capacitance-type sensor configured to detect operations on the basis of electrostatic capacitances formed between an operating finger and detection electrodes.

The detection electrodes are arranged on the substrate 2 in a grid pattern and are insulated from each other, for example. In the touch sensor 3, the detection electrodes arranged in one direction are driven, and electrostatic capacitances are read out one by one from the detection electrodes arranged in the other direction. Electrostatic capacitances obtained from all combinations of the detection electrodes are output to the controller 8 as detection information $S_1$.

Configuration of Light Source Part 4

The light source part 4 is disposed on the substrate 2 to illuminate the panel 7 from the inner surface 700 side. For example, the light source part 4 is constituted of three light-emitting elements 40 arranged at equal intervals on either side of the touch sensor 3, as illustrated in FIGS. 1A and 2C. Note that any number of light-emitting elements 40 can be used in accordance with the size of the touchpad 1 and the like.

As illustrated in FIG. 1A, three light-emitting elements 40 are disposed adjacent to the side portion 72a and the side portion 72b facing the side portion 72a, of the four side portions of the panel 7. Note that the light-emitting elements 40 may be disposed adjacent to the side portion 73a and the side portion 73b, disposed adjacent to all of the side portions, or disposed adjacent to only one of the side portions.

As illustrated in FIG. 2A, the light-emitting elements 40 are rear-mounted light emitting diodes (LEDs). The light-emitting elements 40 output white light 9, for example. As illustrated in FIG. 1B, the light source part 4 is configured to emit light in accordance with an illumination signal $S_2$ output by the controller 8.

The light-emitting elements 40 are not limited to being of rear-mounted type, and as a variation, the light-emitting elements 40 may be configured to output light parallel to the front surface 20 of the substrate 2. In this case, the light from the light-emitting elements 40 enters the light guide 5 from end portions of the light guide 5.

Configuration of Light Guide 5

The light guide 5 transmits light and guides the light to substantially uniformly shine its entirety, for example. The light guide 5 is formed of silicone and into a thin-plate shape, for example.

As illustrated in FIG. 1A, the light guide 5 guides light for illuminating the mark 79 formed above the touch sensor 3 from the light source part 4, for example. In other words, the light 9 output from the light source part 4 enters the light guide 5 and propagates through the light guide 5, as illustrated in FIG. 2A. The light 9 in the light guide 5 progresses while being reflected at the borders between the light guide 5 and the substrate 2 and between the light guide 5 and the light-blocking part 6, and some of the light 9 is emitted from regions where the light-blocking part 6 is not formed and from the front surface of the panel 7 (the operating surface 710). The regions where the light-blocking part 6 is not formed correspond to the mark 79, and the mark 79 is illuminated by the light 9 being emitted from these regions.

Configuration of Light-Blocking Part 6

The light-blocking part 6 is formed of a coating material having good light-blocking properties, such as an urethane acrylate or epoxy acrylate material. The light-blocking part 6 is black, for example. Accordingly, an operator will see a white mark 79 displayed against a black background.

The light-blocking part 6 is formed on the entire inner surface of the panel 7 and the plurality of recesses 77 formed in the panel 7. The entire inner surface of the panel 7 includes the inner surface 700 of the upper portion 71 and the inner surfaces 701 of the side portion 72a, the side portion 72b, the side portion 73a, and the side portion 73b.

Configuration of Panel 7

The panel 7 is formed, for example, of a highly-transmissive resin such as polycarbonate (PC) or polymethyl methacrylate (PMMA) and into a box shape whose lower end is open.

The substrate 2 and the light guide 5 are disposed in the panel 7, and the substrate 2, the light guide 5, and the panel 7 form an integrated unit. The operating surface 710, which is the front surface of the panel 7, is exposed on the front surface of the floor console in which the panel 7 is installed, for example.

As illustrated in FIGS. 2A and 2C, each of the recesses 77 has a long, narrow, rounded groove shape. The recesses 77 are formed in formation regions 76 on inner sides of a corner portion 74 and a corner portion 75. The formation regions 76 are regions near the light-emitting elements 40. In other words, the recesses 77 are formed in a portion of the borders 702 including borders 703 closest to the light source parts 4. The borders 702 refer to borders between the above-described inner surface 700 of the upper portion 71 and inner surfaces 701 of the side portions.

The recesses 77 are formed in the portion of the borders 702 in order to prevent the flow of the material of the panel 7 from worsening and the yield from decreasing as a result of the panel 7 being thinner at the recesses 77.

In addition, the recesses 77 are formed with the aim of increasing the thickness of the light-blocking part 6 in order to eliminate the possibility of the light-blocking part 6 being too thin to block light sufficiently at the corner portion 74 and the like. Accordingly, the shape of the recesses 77 is not limited to a rounded groove as illustrated in FIGS. 2A and 2B.

The panel 7 is formed with a mold, and protruding portions for forming the recesses 77 are provided in the mold.

Configuration of Controller 8

The controller 8 is, for example, a microcomputer including: a central processing unit (CPU) that carries out computations, processes, and the like on acquired data in accordance with a stored program; a random access memory (RAM) and a read only memory (ROM) that are semiconductor memories; and the like. A program for operations of the controller 8, for example, is stored in the ROM. The RAM is used as a storage region that temporarily stores computation results and the like, for example.

The controller 8 is configured to calculate coordinates of the operating surface 710 where an operation has been detected in accordance with the detection information $S_1$, which is periodically acquired from the touch sensor 3, and output the coordinates as operation information $S_3$ to a connected electronic device. These coordinates are coordinates in a two-dimensional coordinate system preset for the operating surface 710.

The controller 8 is further configured, for example, to generate the illumination signal $S_2$ for driving the light source part 4 in response to the power of the vehicle being on, and output the illumination signal $S_2$ to the light source part 4.

Operations of the touchpad 1 according to the present embodiment will be described below.

Operation

When the power of the vehicle is on, the controller 8 of the touchpad 1 outputs the illumination signal $S_2$ to the light source part 4 to illuminate the upper portion 71 of the panel 7 and periodically acquires the detection information $S_1$ from the touch sensor 3.

When an operation has been detected on the basis of the acquired detection information $S_1$, the controller 8 generates the operation information $S_3$ including information on the coordinates where the operation was detected, and outputs the operation information $S_3$ to the connected electronic device. The touchpad 1 continues to illuminate the panel 7 and to detect operations until the power of the vehicle is off.

Effects of Embodiment

The touchpad 1 according to the present embodiment minimizes light leakage and provides a superior design. To be more specific, in the touchpad 1, the formation of the recesses 77 in the borders 702 between the upper portion 71 and side portions (the side portion 72a and the side portion 72b), where it is difficult for the light-blocking part 6 to be formed, makes the light-blocking part 6 thicker than in other areas, which minimizes light leakage from the borders 702 and provides a superior design compared to a case where the recesses are not provided.

In the touchpad 1, the formation of the recesses 77 minimizes light leakage at the borders 702 near the light source part 4, which eliminates the need for repeated coatings and thus reduces the manufacturing cost.

In the touchpad 1, the formation of the recesses 77 in the formation regions 76 including the borders 703 closest to the light source part 4 minimizes defects in the panel 7 and increases the yield compared to a case where the recesses 77 are formed in all of the borders 702.

Although several embodiments of the present invention have been described above, these embodiments are merely examples and the invention according to the claims is not to be limited thereto. These novel embodiments may be implemented in various other forms, and various omissions, substitutions, changes, and the like can be made without departing from the spirit and scope of the present invention. In addition, all the combinations of the features described in these embodiments are not necessarily needed to solve the technical problem. Further, these embodiments are included within the spirit and scope of the invention and also within the invention described in the claims and the scope of equivalents thereof.

What is claimed is:

1. A panel, comprising:
   a light-transmissive main body comprising an upper portion and a plurality of side portions contiguous with the upper portion,
   a recess being formed at a border between an inner surface of the upper portion and an inner surface of at least one of the plurality of side portions; and
   a light-blocking part having a portion formed within the recess and a portion formed on an inner surface of the main body, the light-blocking part being configured to block light except for a design part included within the portion formed on the inner surface of the main body that transmits light,
   wherein the recess increases the thickness of the light blocking part at the border between the inner surface of the upper portion and the inner surface of at least one of the plurality of side portions.

2. The panel according to claim 1, wherein the recess is formed in a portion of the border including the border closest to a light source part configured to output light.

3. The panel according to claim 1, wherein in the recess the upper portion and the side portions are thinner than those in a position other than the recess.

4. The panel according to claim 1, wherein the portion of the light-blocking part within the recess fills the recess such that the recess blocks light.

5. A touchpad, comprising: a panel comprising:
a light-transmissive main body comprising an upper portion and a plurality of side portions contiguous with the upper portion,
a recess being formed at a border between an inner surface of the upper portion and an inner surface of at least one of the plurality of side portions; and
a light-blocking part having a portion formed within the recess and a portion formed on an inner surface of the main body, the light-blocking part being configured to block light except for a design part included within the portion formed on the inner surface of the main body that transmits light;
a detector configured to detect a touch operation made on a front surface of the upper portion;
a substrate disposed on an inner side of the panel,
the detector being disposed on the substrate; and a light source part disposed on the substrate in a periphery of the detector, the light source part being configured to output light,
wherein the recess increases the thickness of the light blocking part at the border between the inner surface of the upper portion and the inner surface of at least one of the plurality of side portions.

6. The touchpad according to claim 5, further comprising a light guide disposed between the upper portion and the substrate, the light guide being configured to guide light output from the light source part to illuminate the upper portion.

7. The touchpad according to claim 6, wherein the recess is formed in a portion of the border including the border closest to the light source part.

8. The touchpad according to claim 5, wherein the recess is formed in a portion of the border including the border closest to the light source part.

9. The touchpad according to claim 5, wherein in the recess the upper portion and the side portions are thinner than those in a position other than the recess.

10. The panel according to claim 5, wherein the portion of the light-blocking part within the recess fills the recess such that the recess blocks light.

11. A method for forming a panel comprising a light-transmissive main body comprising an upper portion and a plurality of side portions contiguous with the upper portion, a recess being formed at a border between an inner surface of the upper portion and an inner surface of at least one of the plurality of side portions; and a light-blocking part including a design part, wherein all of the light-blocking part is configured to block light except for the design part, comprising the steps of:
applying a portion of the light-blocking part that includes the design part over an inner surface of the main body, and
filling the recess with the light-blocking part such that the recess blocks light,
wherein the recess increases the thickness of the light blocking part at the border where the light-blocking part is applied.

* * * * *